April 23, 1957

A. B. YANUS ET AL 2,789,309

SHRIMP CLAMP

Filed Oct. 5, 1953

INVENTORS.
ALBERT B. YANUS
LOUIS L. CERNY
BY
ATTORNEYS

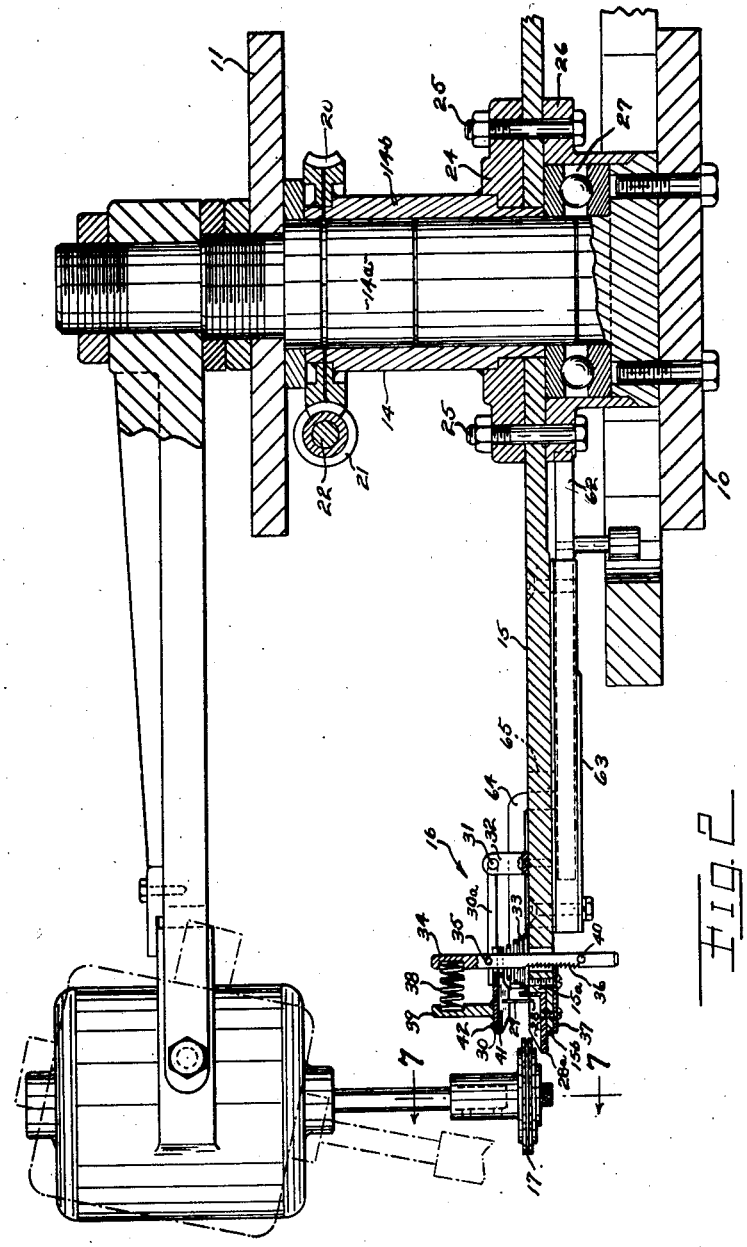

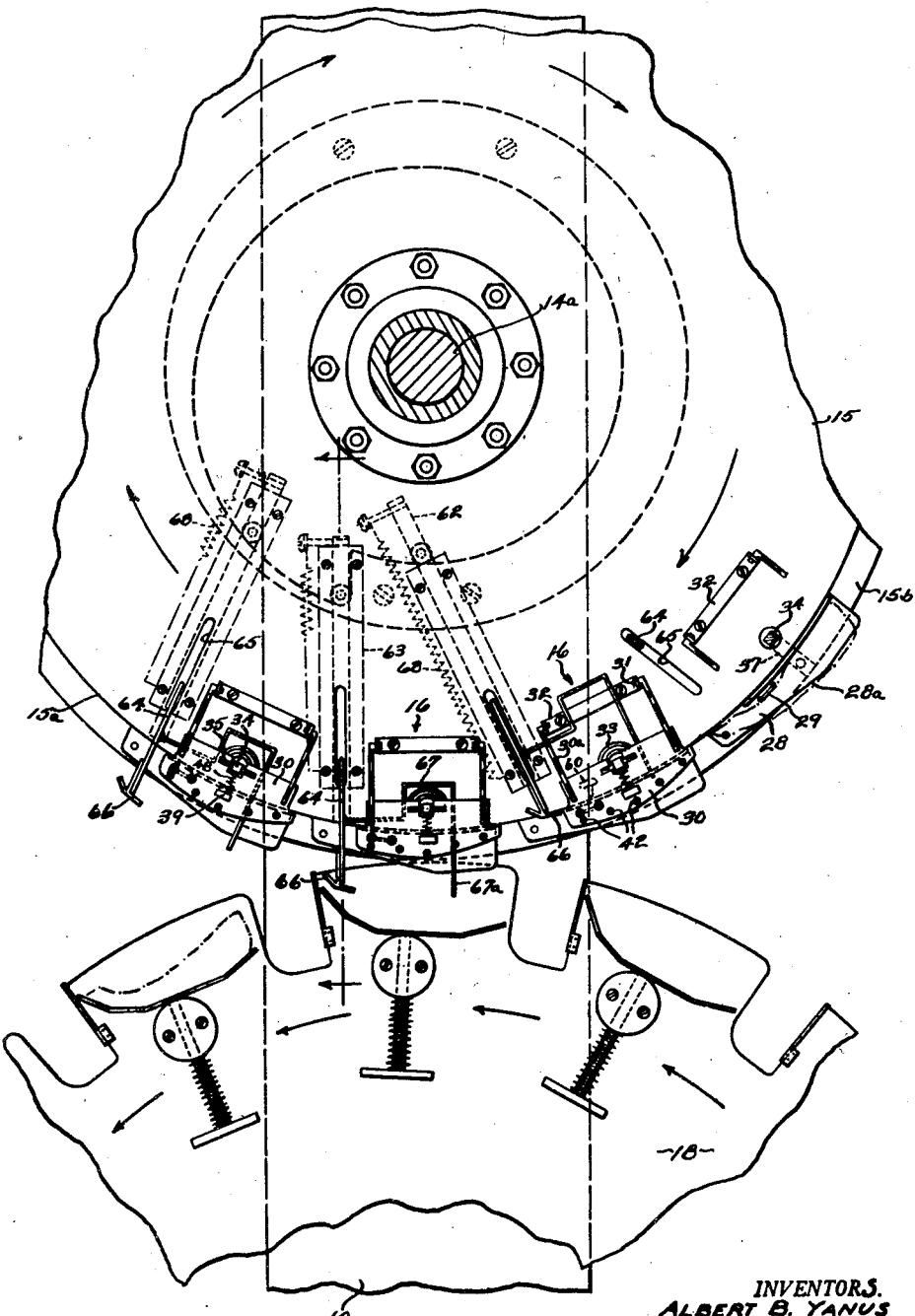

April 23, 1957  A. B. YANUS ET AL  2,789,309
SHRIMP CLAMP
Filed Oct. 5, 1953  6 Sheets-Sheet 4
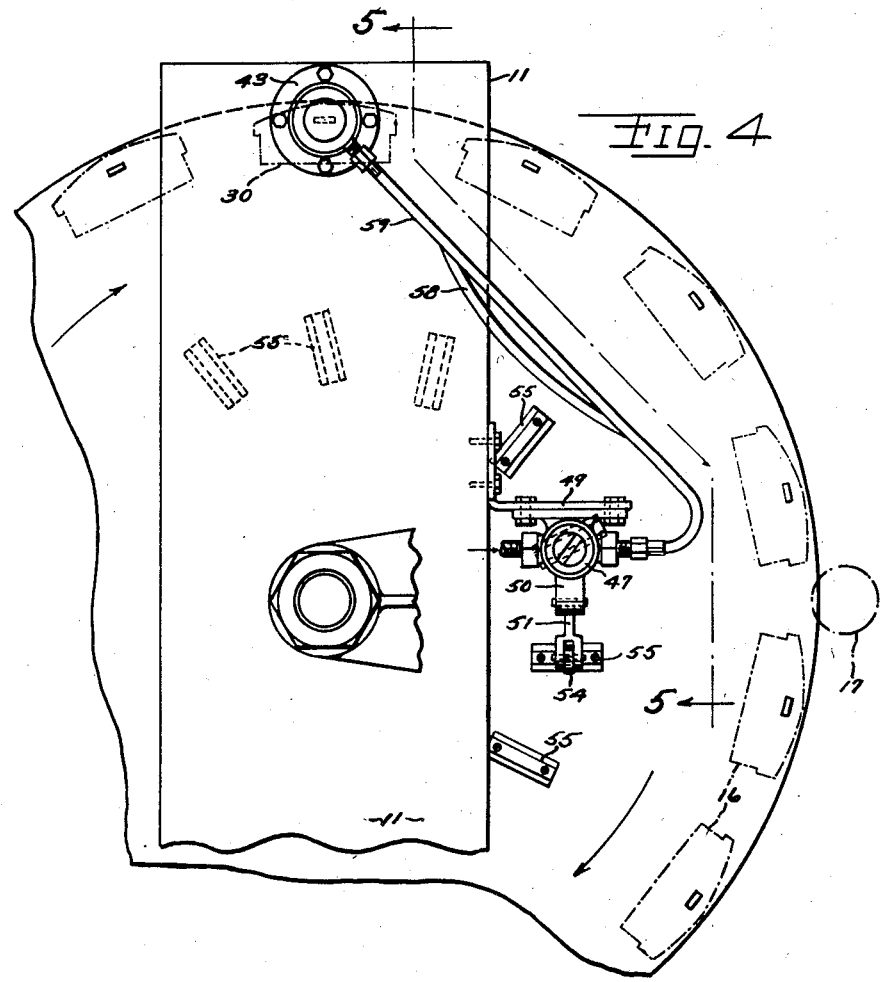
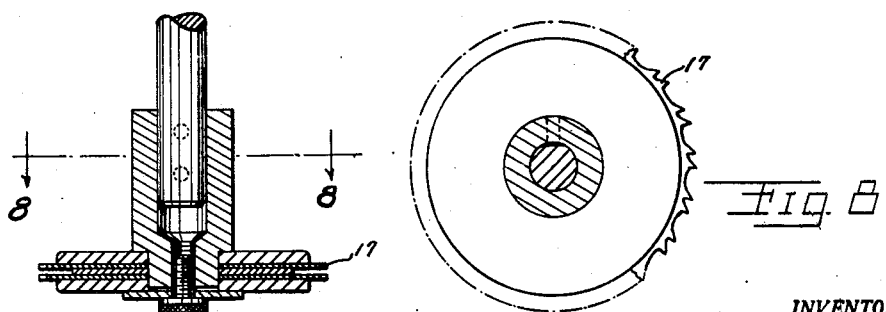
INVENTORS.
ALBERT B. YANUS
LOUIS L. CERNY
BY
ATTORNEYS April 23, 1957     A. B. YANUS ET AL     2,789,309
SHRIMP CLAMP Filed Oct. 5, 1953     6 Sheets-Sheet 5

INVENTORS.
ALBERT B. YANUS
LOUIS L. CERNY
BY
ATTORNEYS

April 23, 1957 A. B. YANUS ET AL 2,789,309
SHRIMP CLAMP
Filed Oct. 5, 1953 6 Sheets-Sheet 6

INVENTORS.
ALBERT B. YANUS
LOUIS L. CERNY
BY
Hyde, Meyer, Baldwin & Doran
ATTORNEYS

United States Patent Office 2,789,309
Patented Apr. 23, 1957

2,789,309
SHRIMP CLAMP

Albert B. Yanus, Parma, and Louis L. Cerny, Cleveland, Ohio, assignors to The Alpha Shrimp Machine Corporation, Cleveland, Ohio, a corporation of Ohio Application October 5, 1953, Serial No. 384,232

11 Claims. (Cl. 17—2)

This invention relates to improvements in a clamp for holding a small crustacean such as a shrimp in a machine for deveining the shrimp.

One of the objects of the present invention is to provide an improved clamp for holding the body of a shrimp on a table adapted to feed the clamped shrimp body to a saw or other deveining device.

Among the objects of the present invention is to provide a clamp which is reasonably cheap and easy to manufacture and assemble, one which is quickly closed and opened, and one which will firmly hold the body of the shrimp in the desired position.

A further object of the present invention is to provide a clamp having a wedge shape platform beneath the shrimp adapted to hold the tapering shrimp body with its axis generally horizontal so that the vein extending along the ventral portion of the body may be presented substantially horizontally to a deveining device such as a saw.

A further object of the present invention is to provide a special clamp adapted to hold the tail portion of the shrimp firm while it is presented to the deveining device but adapted to quickly release the tail portion of the body at about the same time that the clamp is released from the shrimp.

Other objects and advantages of this invention will be apparent from the accompanying drawings and description and the essential features will be set forth in the appended claims.

In the drawings,

Fig. 2 is a sectional view enlarged taken along the line 2—2 of Fig. 1;

Fig. 3 is a fragmental view enlarged taken along the line 3—3 of Fig. 1 and being mostly in top plan view with a portion thereof in section.

Fig. 4 is a fragmental top plan view enlarged taken from the position of 4—4 of Fig. 1.

Fig. 7 is a fragmental sectional view enlarged taken along the line 7—7 of Fig. 2.

Fig. 8 is a fragmental view taken along the line 8—8 of Fig. 7.

Fig. 9 is a top plan view of a modified form of clamp adaptable for use in my invention, and mounted on table 15 in place of the clamping stations of Fig. 3.

Fig. 10 is a transverse sectional view of the same taken along the line 10—10 of Fig. 9, while Fig. 11 is an elevational view of the same taken from the right-hand side of Fig. 10 and indicating in dot-dash lines a cam which cooperates with a portion of the clamp.

We have chosen to show our invention as utilized in a machine described and claimed in our copending patent application, Serial No. 139,862 filed January 21, 1950 now Patent No. 2,683,281, issued July 13, 1954, for deveining and deshelling machine. It should be understood, however, that our invention is applicable to any conveying means adapted to carry a shrimp in clamped position to a deveining device of the general type here described.

The above mentioned copending application gives a complete description of the machine shown and only sufficient description will be given here to understand the operation of our improved clamping means.

Figure 1:
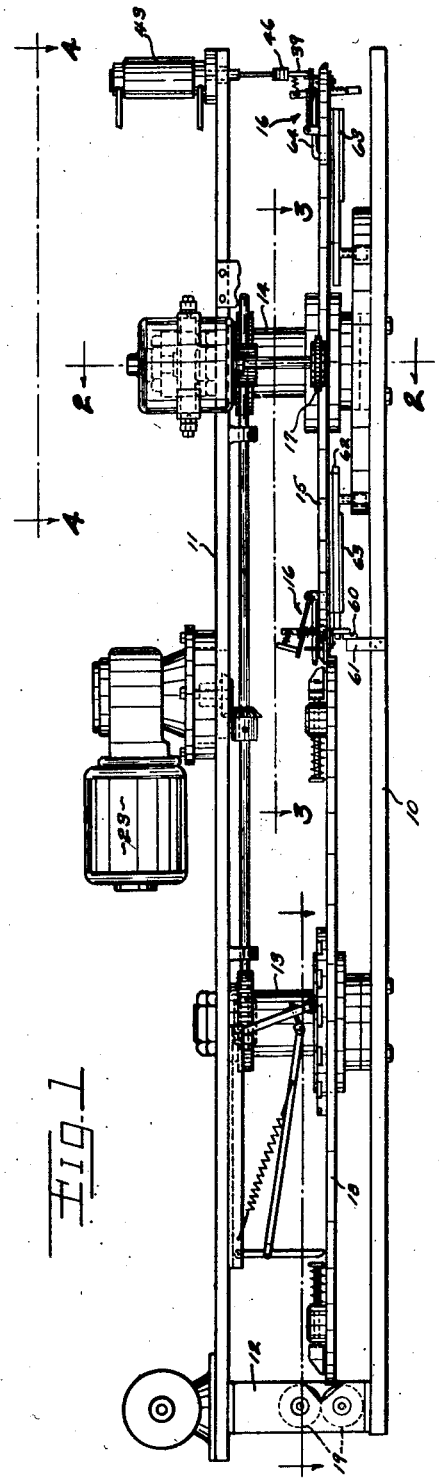
Fig. 1 is a side elevational view of apparatus embodying our invention.

Referring to Fig. 1, the machine comprises a lower base plate 10 and an upper frame plate 11 which are generally parallel. These two plates are held in their spaced relation by suitable frame work including the roller supporting frame 12 at the left-hand end and the deshelling table post 13, and by the deveining table post 14. The deveining table 15 is rotatable about the post 14 in a generally horizontal plane. This table carries at its periphery a plurality of shrimp clamping stations 16. While moving about the table 15, in clamped position, each shrimp has its vein removed by a sawing operation which includes the small rotatable saw 17 mounted to saw a short distance into the back of each shrimp along the entire length thereof as the shrimp passes the saw. A deshelling table 18 is rotatable about the post 13. At the point of tangency between these two tables, as clearly shown in Fig. 3, each shrimp is unclamped and then pushed from table 15 onto table 18, where the shrimp lies in unclamped condition as table 18 carries it in a counterclockwise direction as viewed in Fig. 3 until the shrimp lies on table 18 opposite a pair of deshelling rollers 19. As the shrimp reaches registration with these rollers, a pushing device feeds the shrimp toward the rollers 19 which pull the shell off the body of the shrimp after which the shrimp drops through a suitable opening in the table 18 both deveined and deshelled.

Referring to Fig. 2, the post 14 is a composite assembly comprising a central fixed post proper 14a which is fixed to the base plate 10. Rotatably mounted on post 14a is sleeve 14b which has secured to it a worm wheel 20 which is driven by means of a worm 21 which in turn is driven by a shaft 22 suitably connected with a drive motor 23 as taught in the above copending application. To the lower end of the sleeve 14b is rigidly fixed the flange 24. Bolts 25 pass through flange 24, table 15 and a collar 26 which is rotatably supported on the base plate 10. A friction reducing bearing 27 contributes to the easy rotation of the table 15 about the post 14a.

Referring chiefly to Figs. 2 and 3, there are a plurality of the clamping stations 16 spaced around the periphery of the table 15, each station being adapted to clamp a single shrimp on the periphery of the feed table so as to feed the shrimp to the deveining device. In one form of our device there are 14 such stations spaced evenly about the periphery of the table 15. Since each of these is alike, one only of them will be described. Extending around the entire periphery of table 15 is an annular shoulder 15a beneath which a flange 15b extends radially outwardly to provide a shelf. At each clamping station, an L-shaped wedge plate 28 is secured to flange 15b. A horizontal portion 28a of this plate rests upon the shelf 15b and is secured thereto as by screws. The leading edge of the plate portion 28a is narrower measured in a radial direction than the trailing edge thereof. The tail of the shrimp is placed at the leading edge and the body portion toward the trailing edge. A stop member 29 is provided upstanding from the plate portion 28a so as to position the thinner portion of the shrimp between the body and the tail against these two pins in the position indicated in dot-dash lines in Fig. 3 toward the right-hand side thereof. At each clamping station, a movable clamp plate 30 is provided to engage the upper side of the body of the shrimp. This clamp plate has a pair of arms 30a extending radially inwardly and pivotally mounted at 31 in a bracket 32 extending upwardly from the table 15. A conical shape coil spring 33 between plate 30 and table 15 biases plate 30 upwardly. A lock bar 34 is pivotally mounted to plate 30 at the point 35. Below table 15, the radially outermost face of bar 34 is provided with a series of fine ratchet teeth 36. These are adapted to engage against a retaining plate 37 which is secured on the underside of the shelf 15b. The teeth 36 are normally urged toward the plate 37 by means of a coil spring 38 which is held between the upper end of bar 34 and a bracket 39 upstanding from plate 30. It results from this construction, that when the plate 30 is clamped down upon the shrimp, one of the ratchet teeth 36 will engage the plate 37 to hold plate 30 in clamping position. A pin 40 on bar 34 is adapted to engage the underside of table 15 so as to limit the upward movement of clamping plate 30 under the influence of spring 33. Preferably, but not necessarily, a roughened surface is provided on the radially outermost side of clamping plate 30, where it engages the shrimp, as by means of a roughened plate 41 screwed to plate 30 by the screws 42, or otherwise. This aids in clamping the shrimp firmly in position for the deveining action.

Figures 5, 6:
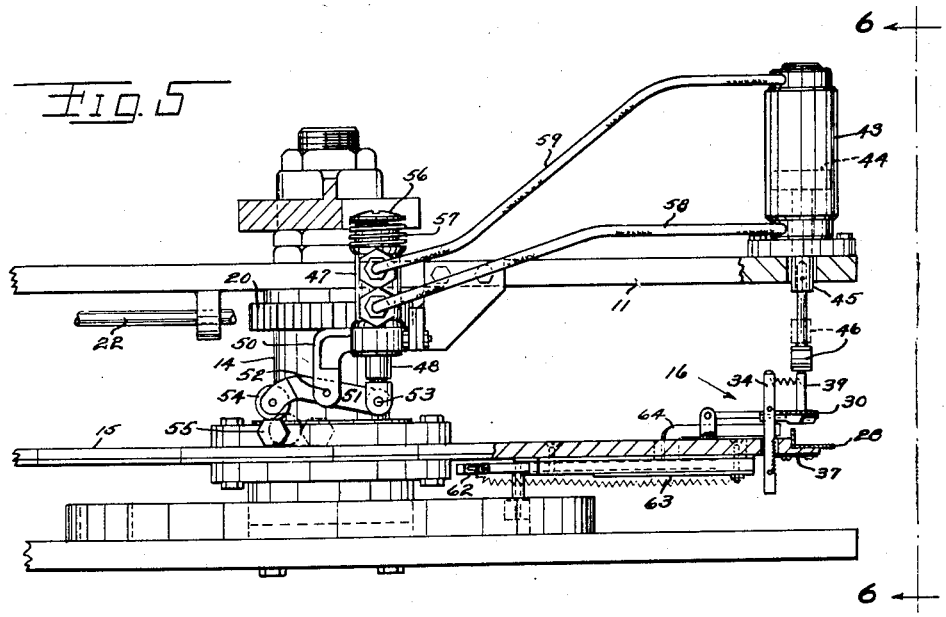
Fig. 5 is a fragmental view mostly in elevation but with certain portions broken away in section and taken along the line 5—5 of Fig. 4.
Fig. 6 is a fragmental end elevational view taken from the position of the line 6—6 of Fig. 5.

Each clamping plate 30 may be moved downwardly by hand to clamp a shrimp in place, but we prefer to do this operation automatically as clearly shown in Figs. 4, 5 and 6. At the outermost end of plate 11 and axially aligned over the path of travel of the bracket or post 39 on top of each plate 30, we mount a pneumatic cylinder 43 within which is a reciprocating piston 44 having a piston rod 45 on the lower end of which is fixed a head 46. An air valve 47 of piston type having a piston rod 48 is mounted in fixed position by means of a bracket 49 secured to plate 11. A fixed bracket 50 pivotally mounts an operating lever 51 at pivot 52. One end of lever 51 is pivotally connected at 53 to the lower end of piston rod 48. The other end of lever 51 carries a roller 54 which is adapted to strike and ride over a plurality of cams 55 secured in a circle on the upper face of table 15. Preferably, each of these cams is cheaply formed of a piece of hexagon bar. To the upper end of the piston valve there is secured a head 56 and a spring 57 acting beneath this head serves to urge the piston valve always toward its uppermost position. The devices 43 and 47 are of known type. A source of compressed air is connected to the valve 47 by means not shown. When the piston valve of valve 47 is in its normal or uppermost position, the roller 54 is in the dot-dash position of Fig. 5, piston 44 is in its uppermost position because air is being fed through line 58 beneath piston 44, and the head 46 is in the dot-dash position as shown in Fig. 5. As each clamping plate 30 passes beneath cylinder 43, the associated cam 55 on table 15 carries roller 54 upwardly to the full line position of Fig. 5. This rocks lever 51 carrying the piston rod 48 downwardly and causing air to pass through conduits 59 to the upper end of cylinder 43 so as to drive piston 44 suddenly downwardly causing the head 46 to strike the post or bracket 39, whereby the movable clamping plate 30 is pushed downwardly on the body of a shrimp which an operator is holding in proper position on the plate portion 28. It will be understood that when air under pressure is being fed through either conduit 58 or 59, the other conduit becomes an exhaust line and is open to the atmosphere through the valve 47. It results from this construction that the clamping head 46 presses each clamping plate 30 down with a yieldable clamping action against the body of the shrimp. By properly regulating the pressure of the air in cylinder 43, we arrange to firmly clamp the body of the shrimp without excessive squeezing of the same. The rounded bottom surface on the head 46 is to prevent damage in case of air failure, during which time the head 46 might be in its lowermost position as shown in Fig. 6 and each post 39 would strike the head 46 as the table 15 continued to turn.

Means is provided for automatically releasing each of the clamping plates 30 just before table 15 has carried the shrimp to the tangent point to table 18 so as to release the shrimp for transfer from table 15 to table 18. As clearly shown in Figs. 1 and 3, this comprises a cam 60 mounted on a bracket 61 on base plate 10. This cam is positioned to strike a glancing blow to the lower end of each bar 34 as each station 16 passes the cam 60. The cam 60 then pushes the lower end of bar 34 radially inwardly for a distance sufficient to release the ratchet teeth 36 from the plate 37, whereupon the clamping plate 30 will jump upwardly under the influence of spring 33.

Means is provided for automatically transferring each shrimp from table 15 to table 18 as the shrimp passes the tangent point as shown in Fig. 3. Referring chiefly to Figs. 2, 3 and 5, a bar 62, one for each station 16, is mounted for reciprocation beneath table 15 by means of a bracket 63 embracing the bar. An L-shaped bracket 64 extends upwardly from each bar 62 through a suitable slotted opening 65 in table 15. The bracket 64 extends radially outwardly and carries a shoe 66 at its outer end. Radially inwardly therefrom, a wire member 67 is rigidly secured to the bracket 64 and, as clearly seen in Fig. 3, this wire is bent to clear all obstructions and terminates in a generally radially extending portion 67a, the outer end of which lies radially perhaps a little farther outwardly from table 15 than the shoe 66. The end of the radially extending wire portion 67a and the shoe 66 engage the shrimp during the pushing action to transfer the shrimp from table 15 to table 18. This action is brought about by means described in the above mentioned copending application.

Figures 9, 10, 11:
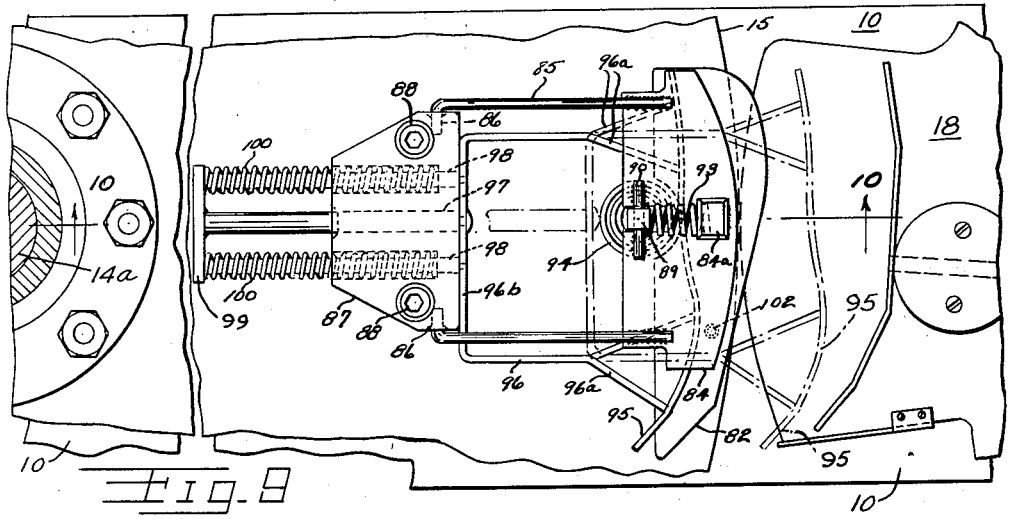

In Figs. 9, 10, and 11, we show another form of clamp which may be substituted for that just described at each of the clamping stations 16 previously mentioned. At each clamping station, a wedge shape shrimp supporting plate 82 is firmly secured to the table 15 by means of screws 83. This plate is thicker at the left-hand end as viewed in Fig. 11, this being the leading edge of the clamping station as the table 15 revolves in the direction of the arrow shown in Fig. 11. The right-hand end of this plate 82 comes down to a very thin edge adjacent the top surface of the table 15. The purpose of the wedge-shaped plate 82 is to support the general longitudinal axis of a shrimp in a generally horizontal direction as it approaches the saw 17. The tail of the shrimp lies at the thicker or left-hand edge of the wedge plate 82 as viewed in Fig. 11 and the main body portion (with the head cut off) lies toward the right in Fig. 11. For clamping the body of the shrimp on the plate 82, a clamp plate 84 is provided generally in registration above the wedge plate 82 and extending between 75 and 80% of the distance from right-hand edge of plate 82 toward the left as viewed in Fig. 11. This clamping plate is mounted by means of two parallel arms 85 rigidly connected to plate 84 and pivotally mounted at 86 in a block 87 which is secured to table 15 by means of bolts 88. This provides for oscillation of the clamping plate 84 so as to firmly hold shrimps of varying thickness firmly clamped on the base plate 82. A locking ratchet bar 89 is pivotally mounted on a pin 90 which is secured to plate 84 so as to mount the bar 89 for slight oscillation about the pivot point 90. A plate 91 is secured to the lower face of table 15 by means of screws 92. This plate has a sharpened rear edge 91a adapted to enter the teeth 89a of the ratchet bar. The upper end of the ratchet bar as viewed in Fig. 10 is urged toward the left by a helical spring 93 which engages between the upper end of the bar and a projection 84a on the plate 84. This urges the teeth 89a toward the sharp edge 91a in a resilient manner. The teeth 89a are so formed that they scrape over the edge 91a as the plate 84 moves downwardly to clamp a shrimp. When the shrimp is firmly clamped, then the ratchet teeth 89a hold the clamping plate 84 firmly on the body of the shrimp. Release of each clamping plate 84 may be accomplished in the same manner previously described in connection with the first modification wherein a cam 60 mounted on the base plate 10 strikes the lower end of each bar 89 as the table 15 rotates, so as to release the clamping plate 84 after the deveining saw has done its work and before the shrimp reaches the tangent point between tables 15 and 18. To reduce the wear when cam 60 strikes the lower end of each bar 89, I have mounted a rotatable cam follower 89b on the lower end of each bar 89. The cam 60 moves the lower end of ratchet bar 89 toward the left as viewed in Fig. 10 so that the teeth 89a escape from the dogging edge 91a. A coil spring 94 then returns the clamping plate 84 upwardly.

The clamp here shown may be yieldingly closed against the body of a shrimp (laid on the plate 82 by an operator) utilizing the piston and cylinder arrangement 43, 44 previously described.

A pusher device is provided for pushing a shrimp from table 15 to table 18 when the point of tangecy is reached. This pusher device comprises a pusher plate 95 generally conforming to the ventral side of a shrimp lying on the plate 82. A bracket 96 has two bifurcated ends 96a rigidly secured to the back of plate 95. The bracket 96 is generally of U form with the cross bar 96b radially inwardly and with the legs of the bracket 96 extending radially outwardly therefrom. The bracket 96b is rigidly connected with a push bar 97 and two parallel guide bars 98 which extend generally radially inwardly of table 15. A pusher head 99 is secured to the radially inward end of the bars 97 and 98. These bars 97 and 98 extend slidably through suitable bores in the block 87 previously mentioned. Helical springs 100 surrounding each of the bars 98 and held in a suitable pocket in block 87 urge the pushing device toward the left as viewed in Figs. 9 and 10. Suitable means (not shown) terminating in a kicker member 101 shown in Fig. 10 is arranged to push the parts 99, 98, 97 and 96 radially outwardly when the tangential point is reached between tables 15 and 18 so as to transfer a shrimp off of the base plate 82 to table 18. As soon as the kicker device 101 has performed a stroke, the springs 100 return the pusher device from its outermost or actuated position shown in dot-dash lines in Fig. 9 to the partially full and dotted line position there shown which is the normal position of rest. In this position of the pusher device, there is room to place the body of a shrimp on the plate 82, at which time the plate 95 serves as a stop or positioning member for the operator to push the ventral side of the shrimp up against plate 95 and thus insure that the shrimp is properly positioned on the base plate 82.

One portion of the shrimp which is difficult to hold firmly while cutting the dorsal side with the saw blade 17a, is that portion where the tail of the shrimp joins the body thereof. At this point, we provide a sharp pin 102, best seen in Fig. 11 having its upwardly directed point normally lying at or just below the upper surface of the base plate 82, and adapted to make a vertical stroke upwardly to pierce the body of the shrimp from below. It will be noted that the position of the pin 102 is approximately ⅓ of the length of the base plate 82 as measured from the left or thicker end thereof. The pin 102 carries a head 102a on its lower end and a bracket 103 supports a coil spring 104 which normally urges the pin 102 downwardly to the position shown in Fig. 11. Referring to Fig. 4, between the cylinder 43 where a shrimp is secured in one of the clamps, and the position of saw 17, there is provided on the base plate 10 a cam 105 shown diagrammatically in dot-dash lines in Fig. 11 in position so that the first engaged end of the cam striking the head 102a of pin 102 is inclined upwardly in the direction of travel of table 15 as shown at 105a. This is for the purpose of camming the head 102a upwardly sufficiently to cause the pin 102 to pierce the body of a shrimp lying on the plate 82 and thus fix that point of the shrimp body firmly against radial movement relative to table 15 during the sawing operation. The dwell surface 105b of the cam 105 is of sufficient length to extend beyond the position of saw 17, after which the cam 105 terminates and allows the pin 102 to drop downwardly under the urging of spring 104. This releases the body of the shrimp from the pin 102 before the pusher device operates the plate 95 to push the shrimp off of table 15.

We have thus disclosed two novel clamping devices, either of which is adapted to clamp a shrimp firmly on a conveying device so as to hold the longitudinally extending axis of a shrimp parallel to a cutting device for deveining the shrimp along the dorsal side thereof. Associated with each of these clamping devices is a pusher device adapted to push the shrimp away from the clamp after the clamp is released.

What we claim is:

1. In apparatus of the class described, a frame, a shrimp feeding conveyor of movable table form on said frame, means for clamping a shrimp to said table comprising a clamp oscillatably mounted on said table, power means on said frame positioned above said table operatively to engage and to move the clamp to clamping position, and control means on said frame for said power means including a cam operable by movement of said table to cause operation of said power means when said clamp passes beneath said power means.

2. In apparatus of the class described, a frame, a table on said frame, a shrimp supporting platform member on said table, a shrimp clamping plate member oscillatably mounted on said table spaced from and registering with said platform member, releasable means for holding said plate member in various positions relative to said platform member and a pin oscillatably mounted on said table and having a normal position clear of said shrimp support and clamping members, and adapted to project through and beyond one of said members to pierce a shrimp body lying on said platform member.

3. The combination of claim 2 wherein said pin is beneath said table, and including a cam on said frame fixed relative to said table, said cam having a surface camming said pin upwardly responsive to relative travel between said table and cam.

4. In an apparatus for deshelling shrimp comprising a frame, a shrimp feeding conveyor on said frame, said conveyor having a plurality of shrimp clamping stations along its edge; the combination with each said clamping station of a wedge shape platform, said wedge shape platform mounted on said conveyor for supporting a shrimp with its tail toward the thicker end of said platform, abutment means on the side of said platform inwardly from the edge of said feeding conveyor against which the ventral portion of a shrimp may be positioned, and means on said frame for clamping the shrimp to said platform.

5. In an apparatus for deshelling shrimp comprising a shrimp feeding conveyor of movable table form, said movable table having a plurality of shrimp clamping stations along its edge, the combination with each of said clamping stations of a clamp oscillatably mounted on said table, a ratchet arm dependable from said clamp through said table, and holding means for said arm mounted on said table.

6. In apparatus of the class described, a frame, a shrimp supporting table movably mounted on said frame having a shrimp clamping means along its edge, said means comprising a wedge shape platform on said table edge for supporting a shrimp thereupon with its tail toward the thicker end of said wedge shape platform, the inclination of said wedge shape platform being such as to support a shrimp thereon with its vein extending substantially linearly, a clamping plate oscillatably mounted on said table spaced from and registering with said platform, and releasable means on said frame for holding said plate in various positions relative to said platform.

7. The combination of claim 6 including adjustable yieldable means operatively connected with said clamping plate for moving the latter in the direction of said platform, whereby the squeezing action of said clamping plate is definitely controlled.

8. The combination of claim 7 wherein said yieldable means is pressure-fluid-operated expansible chamber means.

9. The combination of claim 6 including means on said frame for releasing said clamping plate, and pusher means mounted on said table near said clamping means, said pusher means having a part reciprocable across said platform to push a shrimp away from said table.

10. The combination of claim 9 wherein said pusher means part generally conforms to the contour of the ventral side of a shrimp, and said part having a normal non-reciprocating position on the side of said platform inwardly from the edge of said table, whereby said part there provides stop means against which a shrimp body may be positioned.

11. In apparatus of the class described, a frame, a shrimp supporting table movably mounted on said frame having a shrimp clamping means along its edge, said means comprising a wedge shape platform on said table edge for supporting a shrimp thereupon with its tail toward the thicker end of said wedge shape platform, the inclination of said wedge shape platform being such as to support a shrimp thereon with its vein extending substantially horizontally, a clamping plate oscillatably mounted on said table spaced from and registering with said platform, releasable means on said frame for holding said plate in various positions relative to said platform, said releasable means comprising a generally vertically extending bar having a horizontally extending pivotal mounting on said plate, the lower end of said bar extending through said table, ratchet teeth on said lower end of said bar, a fixed tooth engaging dog on said table and positioned to engage said teeth, and yieldable means on said frame urging said toothed portion of said bar toward said dog.

References Cited in the file of this patent

UNITED STATES PATENTS

| | | |
|---|---|---|
| 1,760,346 | Correa | May 27, 1930 |
| 2,288,191 | Hayes | June 30, 1942 |
| 2,301,729 | Krull | Nov. 10, 1942 |
| 2,417,472 | Dorff | Mar. 18, 1947 |
| 2,515,101 | Swinden | July 11, 1950 |

FOREIGN PATENTS

| | | |
|---|---|---|
| 229,473 | Germany | Dec. 20, 1910 |